(12) United States Patent
Wada

(10) Patent No.: US 9,277,016 B2
(45) Date of Patent: Mar. 1, 2016

(54) COMMUNICATION SYSTEM, CLIENT APPARATUS, SERVER APPARATUS, COMMUNICATION METHOD, AND PROGRAM

(71) Applicant: CANON KABUSHIKI KAISHA, Tokyo (JP)

(72) Inventor: Katsuhiro Wada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 175 days.

(21) Appl. No.: 13/879,532

(22) PCT Filed: Feb. 27, 2013

(86) PCT No.: PCT/JP2013/056046
§ 371 (c)(1),
(2) Date: Apr. 15, 2013

(87) PCT Pub. No.: WO2013/129685
PCT Pub. Date: Sep. 6, 2013

(65) Prior Publication Data
US 2014/0056313 A1  Feb. 27, 2014

(30) Foreign Application Priority Data

Mar. 2, 2012  (JP) .................................. 2012-047303
Feb. 22, 2013  (JP) .................................. 2013-033871

(51) Int. Cl.
*H04L 29/08* (2006.01)
*H04L 29/06* (2006.01)

(52) U.S. Cl.
CPC .............. *H04L 67/145* (2013.01); *H04L 63/02* (2013.01); *H04L 67/26* (2013.01); *H04L 67/42* (2013.01)

(58) Field of Classification Search
CPC ..................... H04L 61/2553; H04L 29/12471; H04L 67/145; H04L 43/10
USPC .......................... 370/463; 709/203, 249, 250
See application file for complete search history.

(56) References Cited

U.S. PATENT DOCUMENTS

2005/0076104 A1* 4/2005 Liskov .................... H04L 67/42
                                                                709/223
2006/0085548 A1  4/2006 Maher, III et al. ............ 709/227
(Continued)

FOREIGN PATENT DOCUMENTS

| CN | 101103607 A | 1/2008 |
| EP | 1803278 A2 | 7/2007 |
| JP | 2001-251346 A | 9/2001 |
| JP | 2003-18235 A | 1/2003 |

(Continued)

OTHER PUBLICATIONS

"The WebSocket protocol: draft-ietf-hybi-thewebsocketprotocol-17," [online], Sep. 30, 2011, IETF, [Searched on Dec. 27, 2011], Internet <URL:http://tools.ietf.org/html/draft-ietf-hybi-thewebsocketprotocol-17>.

*Primary Examiner* — Xavier Szewai Wong
(74) *Attorney, Agent, or Firm* — Fitzpatrick, Cella, Harper & Scinto

(57) ABSTRACT

In a communication system in which a server apparatus on the Internet is connected to at least one client apparatus on an intranet via a firewall, the client apparatus comprises: acquisition means for acquiring, from the server apparatus, information associated with a transmission interval at which notifications are periodically transmitted to maintain the connection to the server; and management means for maintaining the connection by periodically transmitting the notifications based on the information associated with the acquired transmission interval, and the server apparatus comprises: decision means for deciding an interval, in which the connection in the push communication can be maintained in non-communication, based on the communication status information; and notification means for notifying the client apparatus of the decided interval as information associated with the transmission interval used to maintain the connection in the push communication.

14 Claims, 9 Drawing Sheets

(56) References Cited

U.S. PATENT DOCUMENTS

2010/0281118 A1* 11/2010 Donahue et al. ............. 709/206
2012/0210415 A1*  8/2012 Somani et al. ................... 726/9
2012/0324041 A1* 12/2012 Gerber et al. ................ 709/217
2013/0086207 A1*  4/2013 Lee ........................ H04L 67/26
                                                        709/217

FOREIGN PATENT DOCUMENTS

| JP | 2006-203608 A | 8/2006 |
| JP | 2008-517556 A | 5/2008 |
| KR | 10-2007-0094735 | 6/2013 |
| WO | 2006/044685 A2 | 4/2006 |

* cited by examiner

FIG. 9

| ID | TIME | Client | Data | Status | MAXIMUM NON-COMMUNICATION TIME UNTIL COMMUNICATION HAS SUCCEEDED |
|---|---|---|---|---|---|
| 1 | 2011/08/03 8:00:00 | 192.168.100.200 | Request | | N/A |
| 2 | 2011/08/03 8:30:00 | 192.168.100.200 | Reply Data | OK | 00h30m |
| 3 | 2011/08/03 10:00:00 | 192.168.100.200 | Reply Data | OK | 01h30m |
| 4 | 2011/08/04 10:00:00 | 192.168.100.200 | Reply Data | OK | 24h00m |
| 5 | 2011/08/06 10:00:00 | 192.168.100.200 | Reply Data | NG | |
| 6 | 2011/08/06 12:00:00 | 192.168.100.200 | Request | | | ered in the generation step, by periodically transmitting the notifications based on the information associated with the transmission interval acquired in the acquisition step.
COMMUNICATION SYSTEM, CLIENT APPARATUS, SERVER APPARATUS, COMMUNICATION METHOD, AND PROGRAM

TECHNICAL FIELD

The present invention relates to a communication system, a client apparatus, a server apparatus, a communication method, and a program and, more particularly, to a method of maintaining connection in push communication, and a communication method.

BACKGROUND ART

A communication scheme for continuously maintaining communication connection without imposing any unwanted load on a network has been proposed conventionally. In the conventional technique, disconnection can be prevented by periodically transmitting packets (Keep-Alive). As, for example, a client autonomously decides an appropriate Keep-Alive interval, connection is continuously maintained without imposing any unwanted load on a network (see, for example, Japanese Patent Laid-Open No. 2003-18235).

On the other hand, a push communication scheme of performing communication past a proxy server by continuously maintaining connection from a server on the Internet to a client on an intranet located inside a firewall has been proposed (see, for example, "The WebSocket protocol: draft-ietf-hybi-thewebsocketprotocol-17," [online], Sep. 30, 2011, IETF, [Searched on Dec. 27, 2011], Internet <URL:http://tools.ietf.org/html/draft-ietf-hybi-thewebsocketprotocol-17>).

In Japanese Patent Laid-Open No. 2003-18235, appropriate Keep-Alive transmission is impossible when communication is performed past a firewall by push communication as shown in "The WebSocket protocol: draft-ietf-hybi-thewebsocketprotocol-17," [online], Sep. 30, 2011, IETF, [Searched on Dec. 27, 2011], Internet <URL:http://tools.ietf.org/html/draft-ietf-hybi-thewebsocketprotocol-17>. This indicates that in push communication, a communication device such as a firewall is present in a communication path, so a server cannot perform Keep-Alive transmission to a client apparatus on an intranet at an appropriate interval. As a result, a communication apparatus in a communication path may disconnect connection, so communication from the server on the Internet to the client apparatus becomes impossible.

Also, if the Keep-Alive interval is short, the amount of excess communication increases, so the amount of traffic increases, and the communication efficiency lowers. However, if the Keep-Alive interval is long, communication interruption occurs due to the presence of a firewall, and connection cannot be maintained, so instant data transfer becomes impossible.

SUMMARY OF INVENTION

The present invention has been made in consideration of the above-mentioned problem, and proposes a communication system capable of data transfer while continuing communication connection even if communication regulation, in which communication connection is disconnected, such as a firewall occurs in a communication path.

According to one aspect of the present invention, there is provided a communication system in which a server apparatus on the Internet is connected to at least one client apparatus on an intranet via a firewall, characterized in that the client apparatus comprises: generation means for generating connection in push communication to the server apparatus; acquisition means for acquiring, from the server apparatus, information associated with a transmission interval at which notifications are periodically transmitted to maintain the connection; and management means for maintaining the connection, generated by the generation means, by periodically transmitting the notifications based on the information associated with the transmission interval acquired by the acquisition means, and the server apparatus comprises: communication control means for performing data communication using connection in push communication to the client apparatus; storage means for storing communication status information associated with data communication performed by the communication control means; decision means for deciding an interval, in which the connection in the push communication can be maintained in non-communication, based on the communication status information stored in the storage means; and notification means for notifying the client apparatus of the interval decided by the decision means as information associated with the transmission interval used to maintain the connection in the push communication.

According to another aspect of the present invention, there is provided a client apparatus on an intranet connected to a server apparatus on the Internet via a firewall, characterized by comprising: generation means for generating connection in push communication to the server apparatus; acquisition means for acquiring, from the server apparatus, information associated with a transmission interval at which notifications are periodically transmitted to maintain the connection; and management means for maintaining the connection to the server apparatus, generated by the generation means, by periodically transmitting the notifications based on the information associated with the transmission interval acquired by the acquisition means.

According to another aspect of the present invention, there is provided a server apparatus connected to at least one client apparatus on an intranet via a firewall, characterized by comprising: communication control means for performing data communication using connection in push communication to the client apparatus; storage means for storing communication status information associated with data communication performed by the communication control means; decision means for deciding an interval, in which the connection in the push communication can be maintained in non-communication, based on the communication status information stored in the storage means; and notification means for notifying the client apparatus of the interval decided by the decision means as information associated with a transmission interval in communication to maintain the connection in the push communication.

According to another aspect of the present invention, there is provided a communication method for a client apparatus on an intranet connected to a server apparatus on the Internet via a firewall, characterized by comprising: a generation step of making generation means generate connection in push communication to the server apparatus; an acquisition step of making acquisition means acquire, from the server apparatus, information associated with a transmission interval at which notifications are periodically transmitted to maintain the connection; and a management step of making management means maintain the connection to the server apparatus, generated in the generation step, by periodically transmitting the notifications based on the information associated with the transmission interval acquired in the acquisition step.

According to another aspect of the present invention, there is provided a communication method for a server apparatus connected to at least one client apparatus on an intranet via a firewall, characterized by comprising: a communication control step of making communication control means perform data communication using connection in push communication to the client apparatus; a storage step of storing, in storage means, communication status information associated with data communication performed in the communication control step; a decision step of making decision means decide an interval, in which the connection in the push communication can be maintained in non-communication, based on the stored communication status information; and a notification step of making notification means notify the client apparatus of the interval decided in the decision step as information associated with a transmission interval in communication performed to maintain the connection in the push communication.

According to another aspect of the present invention, there is provided a program characterized by causing a computer to function as: generation means for generating connection in push communication to a server apparatus on the Internet connected via a firewall; acquisition means for acquiring, from the server apparatus, information associated with a transmission interval at which notifications are periodically transmitted to maintain the connection; and management means for maintaining the connection to the server apparatus, generated by the generation means, by periodically transmitting the notifications based on the information associated with the transmission interval acquired by the acquisition means.

According to another aspect of the present invention, there is provided a program characterized by causing a computer to function as: communication control means for performing data communication using connection in push communication to a client apparatus on an intranet connected via a firewall; storage means for storing communication status information associated with data communication performed by the communication control means; decision means for deciding an interval, in which the connection in the push communication can be maintained in non-communication, based on the stored communication status information; and notification means for notifying the client apparatus of the interval decided by the decision means as information associated with a transmission interval in communication to maintain the connection in the push communication.

An appropriate Keep-Alive interval can be decided even in communication between a client and a server via a firewall using the push communication scheme. Also, communication for maintaining continuous connection can be done without imposing any unwanted load on a network.

Further features of the present invention will become apparent from the following description of exemplary embodiments with reference to the attached drawings.

BRIEF DESCRIPTION OF DRAWINGS

FIG. 9 is a table illustrating an example of the configuration of communication status information.

DESCRIPTION OF EMBODIMENTS

Modes for carrying out the present invention will be described below with reference to the accompanying drawings. Note that the following embodiments do not limit the present invention according to the scope of claims, and all combinations of features described in these embodiments are not always indispensable for solving means of the present invention.

First Embodiment

[System Configuration]

Figure 1:
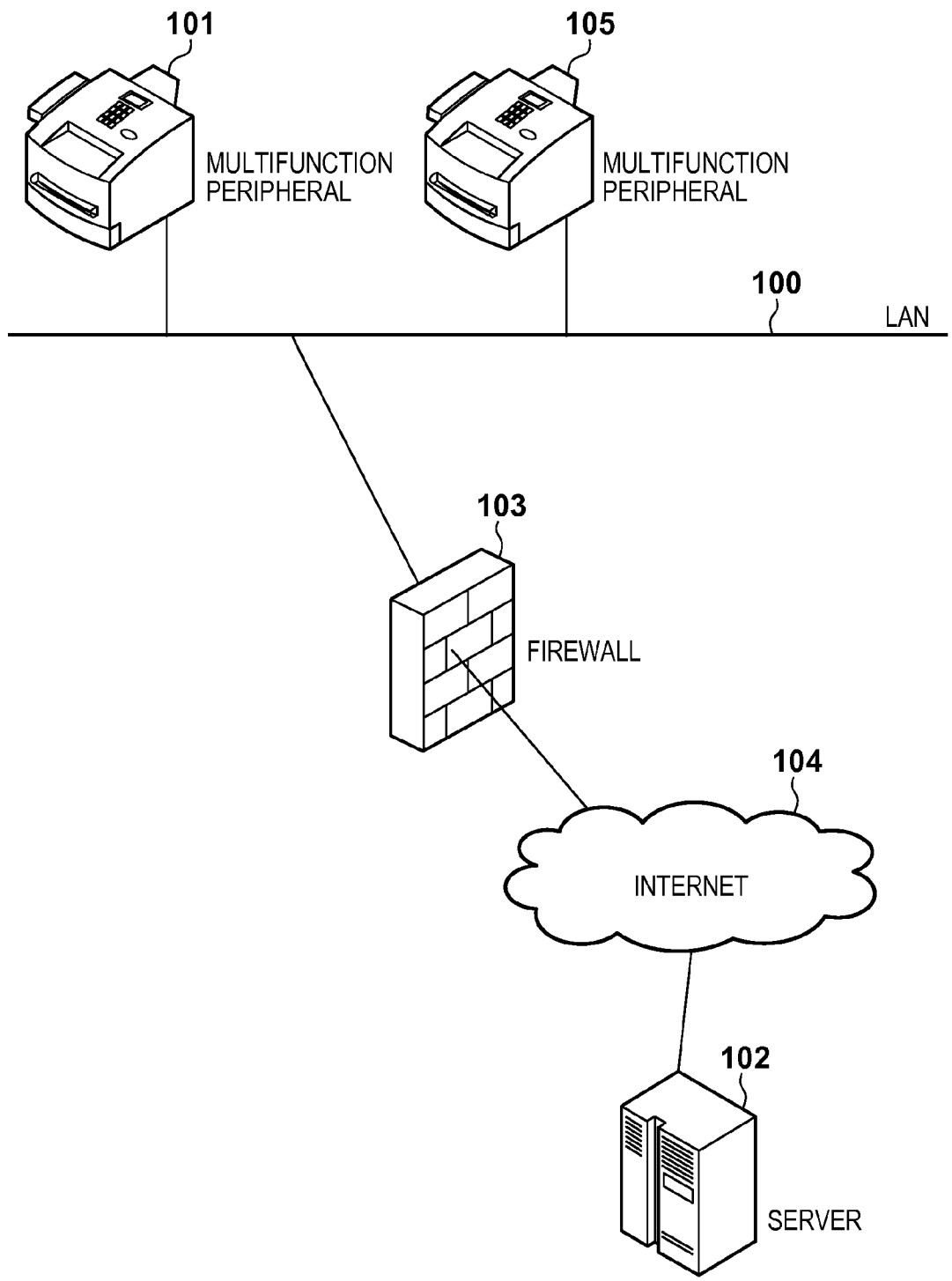
FIG. 1 is a diagram illustrating an example of a system configuration.

An example of the configuration of a communication system according to an embodiment of the present invention will be described. FIG. 1 is a diagram illustrating an example of a system configuration, for explaining the use environment of a communication system according to an embodiment of the present invention.

Note that as long as the functions of the present invention are implemented, the operation of a program on a multifunction peripheral 101 may be executed by a CPU, RAM, or ROM on a printer, scanner, or MFP (Multifunction Peripheral), as a matter of course. Also, the operation of a program on a server 102 may be executed under a virtual computer environment. Referring to FIG. 1, a plurality of multifunction peripherals 101 and 105 are connected to a LAN 100. The server 102 is connected to the multifunction peripheral 101 via a firewall 103 and the Internet 104.

The multifunction peripherals 101 and 105 and server 102 hold IP addresses to communicate with other communication apparatuses on the LAN 100 or Internet 104. The multifunction peripherals 101 and 105 provide services in reply to various requests, like the server 102 and the print server function (LPD: RFC1179). Examples of the services are the Web, files, SNMP (Simple Network Management Protocol), and WS-Eventing.

The server 102 provides services in reply to requests from the multifunction peripherals 101 and 105 serving as service request sources. Examples of the services provided by the server 102 are a Web service, storage service, image processing service, and mail service. Also, the server 102 may communicate with other services in reply to requests from request sources. Moreover, the server 102 may include a virtual server formed by a plurality of physical servers, and a virtual disk formed by a plurality of physical storages. Although only one server 102 is shown in FIG. 1, different types of processing may be physically distributed to a plurality of apparatuses to provide services.

In this embodiment, in push communication between the multifunction peripheral 101 and the server 102, the server 102 detects a communication error sent from the firewall 103. The server 102 decides the connection valid time from the occurrence state of errors in push communication, and notifies the multifunction peripheral of the decided connection valid time. The multifunction peripheral decides an appropriate Keep-Alive communication interval based on the received connection valid time.

Push communication is a communication technique of performing communication from a server apparatus on the Internet to a client apparatus on an intranet past a firewall. An example of push communication is the WebSocket protocol. Note that as long as communication which uses an address is done to send a service provided by the server 102, the protocol may be IPv4 or IPv6 and is not limited to a specific one.

Also, the present invention is applicable to other communication schemes which use networks other than a LAN or the Internet, and a wireless LAN such as IEEE802.11, as the connection scheme between the multifunction peripherals 101 and 105 and the server 102, as a matter of course.

In the present invention, protocols in respective layers: an OSI reference model physical layer, a data link layer, a network layer, a transport layer, a connection layer, a presentation layer, and an application layer are not limited to the above-mentioned communication protocols. Also, a network device, information processing apparatus, and communication apparatus other than those in this embodiment may be connected.

[Configuration of Server]

Figure 2:
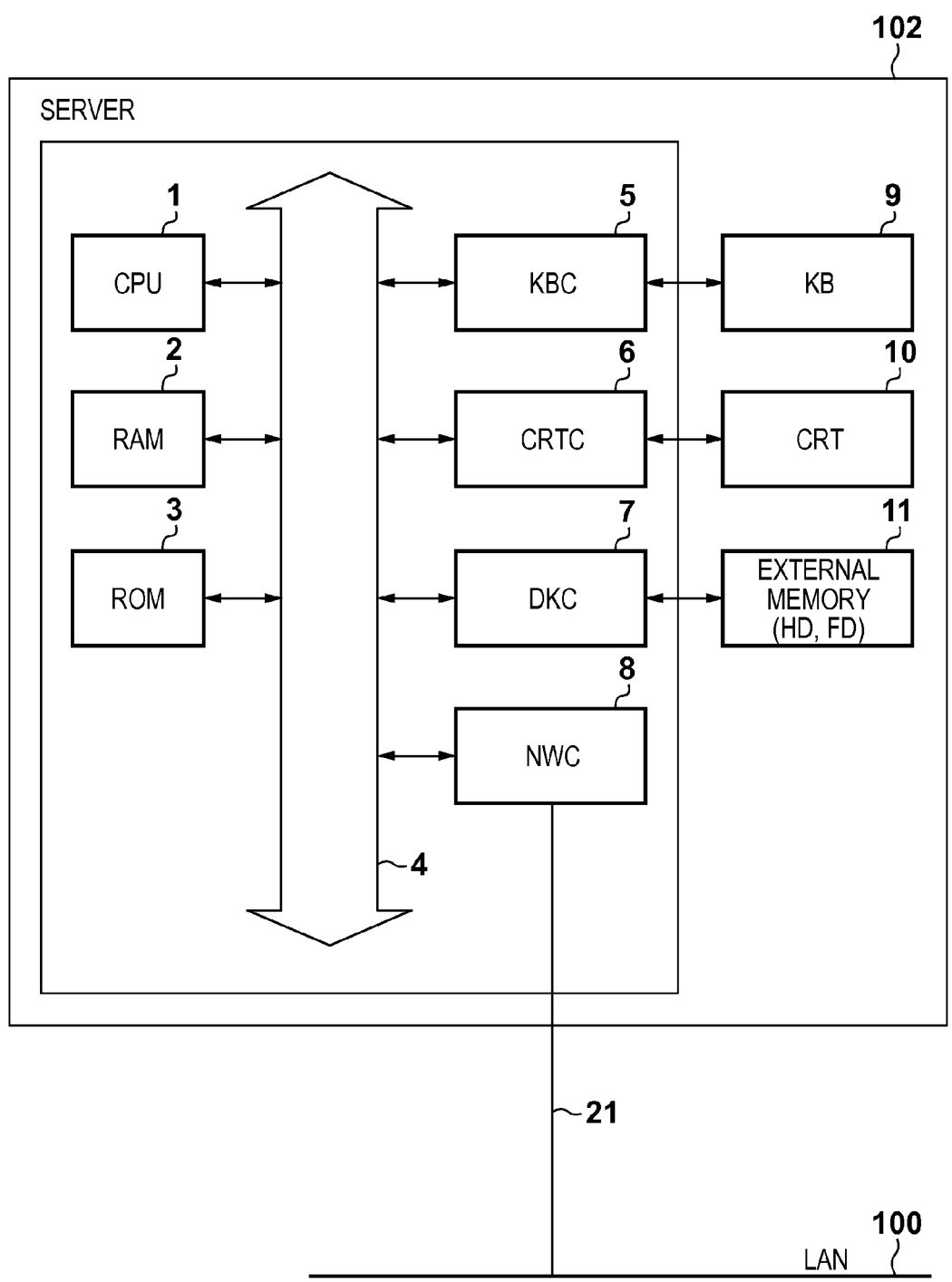
FIG. 2 is a block diagram illustrating an example of the configuration of a host computer serving as a server.

FIG. 2 is a block diagram illustrating an example of the configuration of a computer applicable to the server 102 serving as an information processing apparatus. In the server 102, a CPU 1 is a central processing unit which systematically controls each multifunction peripheral connected to a system bus 4. The CPU 1 executes various types of processing such as processing of a document having a mixture of, for example, a graphics, an image, a text, and a table (including, for example, a spreadsheet), based on an application (for example, a document processing program) stored in an external memory (HD) 11 or a program ROM of a ROM 3.

Also, the CPU 1 executes processing of rasterizing an outline font into a display RAM set on, for example, a RAM 2, and displays it on a CRT (display unit) 10 via a CRTC (display control unit) 6. Moreover, the CPU 1 opens various registered windows and executes various types of data processing, based on commands designated by, for example, a mouse cursor (not shown) displayed on the CRT 10. When the user uses a client application or various services, he or she can open windows associated with operations such as their settings, and perform settings. Note that the display unit is not limited to a CRT, and may use, for example, a liquid crystal display or a plasma display.

The RAM 2 functions as, for example, the main memory or work area for the CPU 1. The ROM 3 includes, for example, a font ROM, program ROM, and data ROM (none is shown). The font ROM or external memory (HD) 11 stores, for example, font data used in, for example, the above-mentioned document processing. The program ROM or external memory (HD) 11 stores, for example, an operating system (to be abbreviated as an OS hereinafter) serving as a control program for the CPU 1. The data ROM or external memory (HD) 11 stores various types of data used in the above-mentioned document processing. Alternatively, the program stored in the external memory (HD) 11 is expanded into the RAM 2 in execution, and executed.

A keyboard controller (KBC) 5 controls information input from a keyboard (KB) 9 or a pointing device (not shown). The CRTC 6 controls display on the CRT 10. A disk controller (DKC) 7 controls access to the external memory 11. A network controller (NWC) 8 is connected to a network 106 via a bidirectional interface 21.

The KB 9 includes various keys. The CRT 10 displays, for example, a graphics, an image, a text, and a table. The external memory 11 is formed by, for example, a hard disk (HD) or a Floppy® disk (FD). The external memory 11 stores, for example, a boot program, various applications, font data, a user file, and an editing file.

Note that the operation of the server 102 may be executed under a virtual computer environment.

[Configuration of Multifunction Peripheral]

Figure 3:
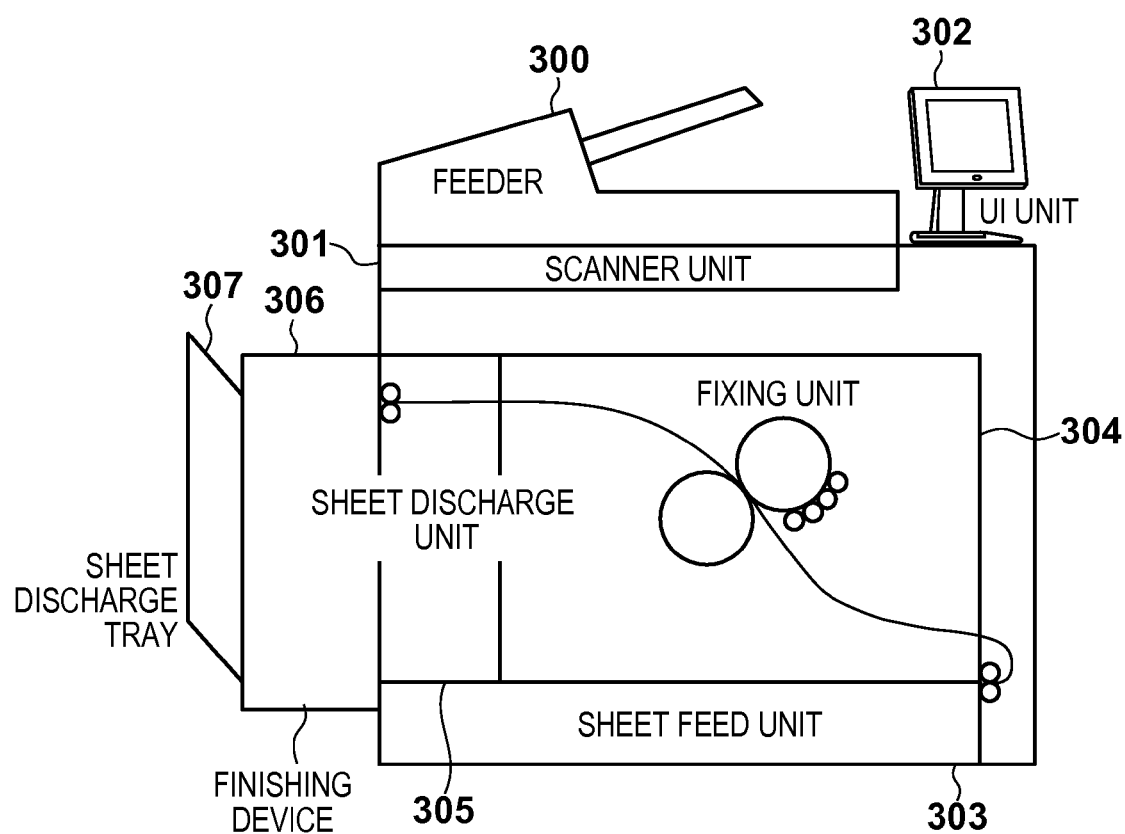
FIG. 3 is a diagram illustrating an example of the configuration of a multifunction peripheral.

FIG. 3 is a diagram illustrating an example of the multifunction peripherals 101 and 105, shown in FIG. 1, serving as client apparatuses. Note that the multifunction peripherals 101 and 105 in this embodiment are applicable not only to an image forming apparatus which provides a multiple of functions such as print, scanner, and facsimile functions, but also to, for example, an apparatus which provides one of these functions. This embodiment shows an example of the configuration of a general multifunction peripheral. Also, an information processing apparatus such as a PC may be used as a client apparatus.

A feeder (automatic document feeder) 300 is a mechanism which feeds a paper sheet in scanning by a scanner unit 301. The document scanner unit 301 scans and digitizes the information of the paper sheet. A UI unit 302 is a mechanism which displays information upon accepting the operation input operation of the multifunction peripheral 101.

A sheet feed unit 303 sends a print sheet to a fixing unit 304 in printing. The fixing unit 304 fixes toner on the sheet fed from the sheet feed unit 303 to print. A sheet discharge unit 305 discharges the sheet printed by the fixing unit 304. A finishing device 306 performs various types of processing including stapling and punching of the sheet discharged from the sheet discharge unit 305, in accordance with order information. A sheet discharge tray 307 holds a printing product having undergone final printing/finishing.

[Software Configuration]

Figure 4:
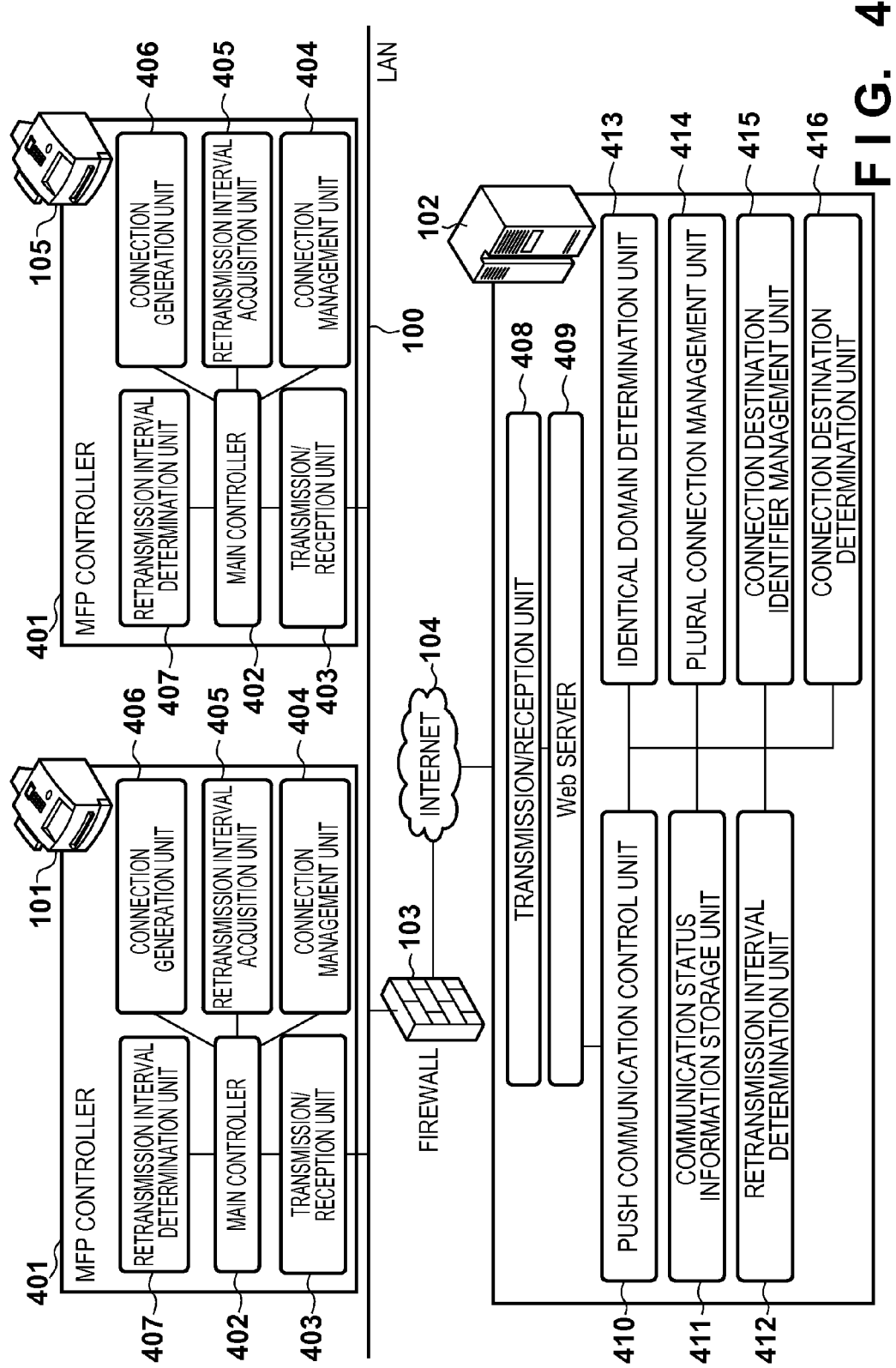
FIG. 4 is a block diagram illustrating an example of the configuration of components of each apparatus.

FIG. 4 is a block diagram for explaining the software configuration of the entire system according to this embodiment.

The multifunction peripherals 101 and 105 serving as client apparatuses communicate with the server 102 serving as a server apparatus on the Internet 104 via the LAN 100 and firewall 103. The firewall 103 may include a proxy server function for making a proxy reply to the client apparatus. Also, although not shown in FIG. 4, the multifunction peripherals 101 and 105 and the server 102 can perform the same processing not only via the firewall 103 but also via other communication apparatuses such as a load balancer and a reverse proxy.

The multifunction peripheral 101 will be described first. Note that the multifunction peripheral 105 has the same configuration. An MFP controller 401 includes software components such as a main controller 402, transmission/reception unit 403, connection management unit 404, retransmission interval acquisition unit 405, connection generation unit 406, and retransmission interval determination unit 407. These software components control the overall multifunction peripheral 101. These software components control hardware components such as the feeder 300, scanner unit 301, UI unit 302, sheet feed unit 303, fixing unit 304, sheet discharge unit 305, finishing device 306, and sheet discharge tray 307 shown in FIG. 3.

The main controller 402 performs main control of the multifunction peripheral 101. The main controller 402 performs control and status monitoring of, for example, the transmission/reception unit 403, connection management unit 404, retransmission interval acquisition unit 405, connection generation unit 406, and retransmission interval determination unit 407 provided in the multifunction peripheral 101.

The transmission/reception unit 403 communicates with the server 102. At this time, the transmission/reception unit 403 communicates via the main controller 402 with the server 102 using data acquired from, for example, the connection management unit 404, retransmission interval acquisition unit 405, connection generation unit 406, or retransmission interval determination unit 407.

The connection management unit 404 manages connection associated with push communication between the multifunction peripheral 101 and the server 102. The retransmission interval acquisition unit 405 acquires a Keep-Alive transmission interval from the server 102. The retransmission interval acquisition unit 405 acquires the Keep-Alive transmission interval decided by the server 102 to maintain connection in push communication.

The connection generation unit 406 generates connection for push communication between the multifunction peripheral 101 and the server 102. The retransmission interval determination unit 407 determines the Keep-Alive transmission interval acquired from the server 102 to decide a Keep-Alive transmission interval that can be set by the multifunction peripheral 101.

The retransmission interval determination unit 407 determines whether the Keep-Alive transmission interval acquired from the server 102 satisfies the operation conditions of the multifunction peripheral 101, and changes the Keep-Alive transmission interval in accordance with these operation conditions. The detailed operation of the retransmission interval determination unit 407 will be described in the fourth embodiment.

In this embodiment, the main controller 402 monitors, for example, these parts, and performs appropriate communication processing with the server 102 to manage connection in push communication between the multifunction peripheral 101 and the server 102. Disconnection of connection in the middle of the communication path due, for example, to the presence of the firewall 103 is avoided to attain efficient push communication.

The internal configuration of the server 102 will be described next. Each processing unit included in the server 102 is implemented by a program stored in, for example, the ROM 3 or external memory 11, and processing of this processing unit is executed by the CPU 1 using the RAM 2 as needed.

A transmission/reception unit 408 transmits/receives information, exchanged between the server 102 and the transmission/reception unit 403 of the multifunction peripherals 101 and 105, using the NWC 8. A Web server 409 is a Web service server which exchanges information with the transmission/reception unit 403 of the multifunction peripheral using a protocol such as the REST (Representational State Transfer) or SOAP (Simple Object Access Protocol). Note that the present invention is not limited to these protocols. The multifunction peripheral and the server 102 may communicate with each other using a protocol such as the TCP (Transmission Control Protocol), UDP (User Datagram Protocol), HTTP, SSL (Secure Socket Layer), or TLS (Transport Layer Security).

The Web server 409 receives a request from the multifunction peripheral, and transfers it to a push communication control unit 410. The Web server 409 also serves to transfer reply information, sent from the push communication control unit 410, to the transmission/reception unit 408.

A configuration example as a feature of the present invention will be described next. The push communication control unit 410 performs overall control for invoking a processing unit required to perform push communication with the multifunction peripheral 101. The push communication control unit 410 controls a communication status information storage unit 411, a retransmission interval decision unit 412, an identical domain determination unit 413, a plural connection management unit 414, a connection destination identifier management unit 415, and a connection destination determination unit 416 to maintain connection in push communication. In this processing, the push communication control unit 410 can perform data communication via the Web server 409 and transmission/reception unit 408 to process requests from a plurality of multifunction peripherals.

The present invention is also applicable to the case wherein these types of processing are performed on a plurality of physical computers or a virtual computer.

Also, when a large number of multifunction peripherals serving as processing request sources for the server 102 are present, it is necessary to hold a large number of connections for a long period of time. In this case, a larger-scale system can be easily established by including a network load balancer and reverse proxy (neither is shown).

The communication status information storage unit 411 stores pieces of information including connection information, connection destination information, and communication status as communication status information managed by the push communication control unit 410. Note that FIG. 9 illustrates an example of the stored information. The communication status information shown in FIG. 9 includes, as items, "ID" for uniquely identifying communication, "Time" indicating the time at which communication is performed, "Client" indicating a communication partner, "Data" indicating the data type of communication, and "Status" indicating the communication result. Also, when communication has succeeded, the information of the time for which non-communication has continued is stored. Note that how to handle these pieces of information will be described in more detail later, together with processing.

The retransmission interval decision unit 412 decides a Keep-Alive transmission interval, required to maintain connection in push communication for each connection, based on the communication status stored in the communication status information storage unit 411.

The identical domain determination unit 413 determines other multifunction peripherals, that belong to identical domains on which the disconnection conditions of connection in push communication are the same, based on the communication status information of the multifunction peripheral 101 managed by the push communication control unit 410. Determining identical domains makes it possible to decide an appropriate Keep-Alive transmission interval based on the pieces of communication status information of other multifunction peripherals belonging to the identical domains even in the absence of the information of the multifunction peripheral, which is identical to the past communication status information. In an example of the software configuration of the entire system shown in FIG. 4, two multifunction peripherals: the multifunction peripherals 101 and 105 belong to identical domains. A more detailed operation of the identical domain determination unit 413 will be described in the third embodiment.

The plural connection management unit 414 holds a plurality of connections between the server 102 and one multifunction peripheral. When connection to this multifunction peripheral is disconnected, this multifunction peripheral is notified of an error from the server 102 by another non-disconnected connection. This makes it possible to quickly restore the disconnected connection. A more detailed operation of the plural connection management unit 414 will be described in the second embodiment.

The connection destination identifier management unit 415 manages the multifunction peripheral serving as a connection destination to allow the plural connection management unit 414 to determine communication with the multifunction peripheral. The connection management unit 404 of the multifunction peripheral issues a client identifier for uniquely determining the multifunction peripheral 101, and sends it in communication with the server 102. The connection destination identifier management unit 415 manages the client identifier of the connection destination for each connection.

The push communication control unit 410 controls the communication status information storage unit 411, retransmission interval decision unit 412, identical domain determination unit 413, plural connection management unit 414, connection destination identifier management unit 415, and connection destination determination unit 416 to maintain connection in push communication.

[Processing Sequence]

In an example of the software configuration of the entire system shown in FIG. 4, a plurality of multifunction peripherals are present, so one multifunction peripheral decides an appropriate Keep-Alive interval first. In this embodiment, one multifunction peripheral is selected by communication between the multifunction peripherals. Note that multifunction peripherals on identical domains may be searched by broadcast communication or multicast communication using the SLP (Service Location Protocol) or SNMP (Simple Network Management Protocol). Also, in this embodiment, a method of selecting one multifunction peripheral by determining an apparatus which operates for a long period of time, and an apparatus with a low CPU utilization ratio is used. However, one multifunction peripheral may be determined from the resources or set values of other apparatuses. The order of priority of apparatuses can be set in these apparatuses in advance, or determined upon selection by the user.

As another method of deciding one multifunction peripheral, a method of deciding one multifunction peripheral by the server 102 in connection from the multifunction peripheral may be used. When the server 102 is connected to a new multifunction peripheral, it selects one multifunction peripheral by determining an already connected multifunction peripheral on an identical domain, an apparatus which operates for a long period of time, and an apparatus with a low CPU utilization ratio. The server 102 may determine one multifunction peripheral from the resources or set values of other apparatuses.

To decide an appropriate Keep-Alive interval, one multifunction peripheral selected in the foregoing way performs push communication while adjusting the Keep-Alive interval. As a method of adjusting the Keep-Alive interval, the following method, for example, can be used. A multifunction peripheral sets a Keep-Alive interval of, for example, 1 hr as a default. When push communication is performed, if no error occurs after 1 hr, the Keep-Alive interval is extended to 2 hrs. If no communication error still occurs, the Keep-Alive interval is further extended (for example, the Keep-Alive interval is sequentially extended to 12 hrs, 24 hrs, and 168 hrs). Note that the extension time of the Keep-Alive interval may be determined by setting a fixed value in advance, or using an arbitrary random value. With these types of processing, the Keep-Alive interval can be extended from an arbitrary default.

As another type of processing for deciding an appropriate Keep-Alive interval, an example of processing of deciding an appropriate Keep-Alive interval when a push communication error has occurred due to too long Keep-Alive interval will be given.

Figure 5:
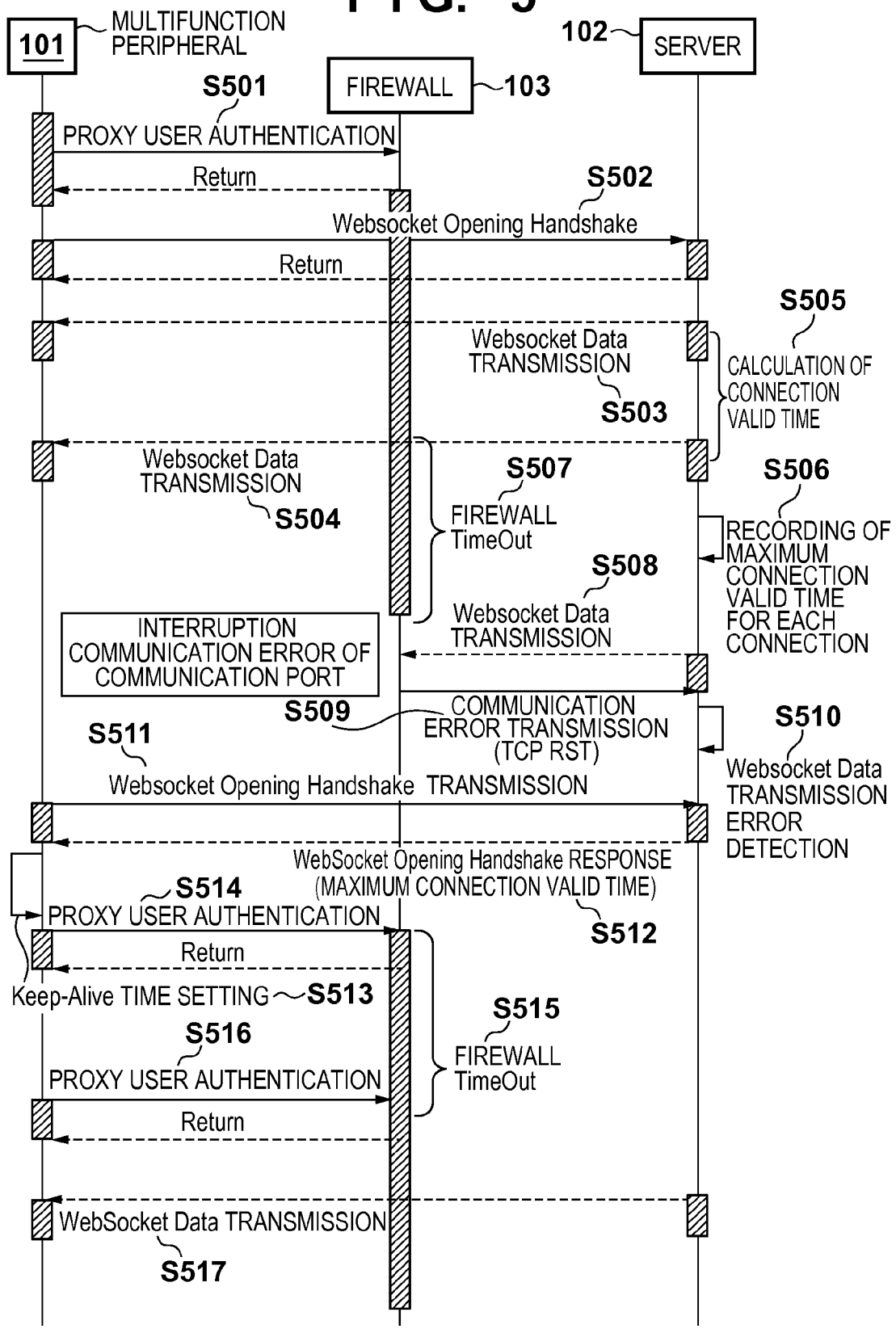
FIG. 5 is a sequence chart illustrating an example of the sequence among the multifunction peripheral, the firewall, and the server.

FIG. 5 shows the processing sequence upon communication among the multifunction peripheral 101, the server 102, and the firewall 103 according to this embodiment. This embodiment takes the firewall 103 as an example of a communication device which disconnects push communication between the multifunction peripheral 101 and the server 102. However, the present invention is not limited to the firewall 103, and the same applies to other communication devices which disconnect connection upon timeout when communication is not done over a given period of time. Also, communication between the multifunction peripheral 105 and the server 102 is performed in accordance with the same sequence.

In step S501, the connection management unit 404 of the multifunction peripheral 101 uses the connection generation unit 406 to perform user authentication of a proxy service for the firewall 103 in push communication with the server 102. As a result, if the firewall 103 permits the multifunction peripheral 101, it sends the result back to the multifunction peripheral 101. The multifunction peripheral 101 then starts communication with the server 102. Note that if the proxy service does not require user authentication, this user authentication processing may be omitted.

The firewall 103 performs user authentication to store information including, for example, the IP address and port number of the multifunction peripheral 101, and permit the multifunction peripheral 101 to communicate with the server 102 as a communication partner. The firewall 103 then confirms the communication status between the multifunction peripheral 101 and the server 102. If the firewall 103 determines the end of communication, the proxy service interrupts communication between the multifunction peripheral 101 and the server 102.

At this time, the firewall 103 determines execution/non-execution of communication interruption using, for example, the time elapsed after authentication by the multifunction peripheral 101, the timeout time after a shift to a non-communication state, and the time elapsed after the end of connection upon monitoring the communication status.

Note that a method of disconnecting connection by a communication device in a communication path is not limited to this embodiment. The case wherein communication is interrupted for other reasons is also included in this embodiment, as a matter of course.

In step S502, the connection generation unit 406 of the multifunction peripheral 101 executes Opening Handshake that allows push communication for the push communication control unit 410 of the server 102 (for details of this processing, see "The WebSocket protocol: draft-ietf-hybi-thewebsocketprotocol-17," [online], Sep. 30, 2011, IETF, [Searched on Dec. 27, 2011], Internet <URL:http://tools.ietf.org/html/draft-ietf-hybi-thewebsocketprotocol-17>). When WebSocket connection is established between the multifunction peripheral 101 and the server 102 upon success of Opening Handshake, the server 102 becomes capable of push communication with the multifunction peripheral 101 past the firewall 103.

At this time, the push communication control unit 410 of the server 102 stores the status information of push communication in the communication status information storage unit 411. FIG. 9 illustrates an example of the communication status information. In communication of step S502, information corresponding to ID "1" is stored in the example shown in FIG. 9. Also, the ID address of the multifunction peripheral 101 which performs push communication with the server 102 in this case is set to "192.168.100.200."

Although WebSocket is used as push communication in this embodiment, the push communication method is not limited to WebSocket, and other push communication methods can also be adopted.

In step S503, the server 102 transmits WebSocket data to the multifunction peripheral 101 located on the intranet side with respect to the firewall 103. At this time, since the firewall 103 permits transmission from the server 102 to the multifunction peripheral 101, it can send WebSocket data to the multifunction peripheral 101 located on the intranet side with respect to the firewall 103. At this time, the push communication control unit 410 of the server 102 stores the time and the transmission/reception state between the server 102 and the multifunction peripheral 101 in the communication status information storage unit 411 as a log.

If communication is not interrupted by the firewall 103, WebSocket data transmission from the server 102 to the multifunction peripheral 101 also succeeds (step S504). At this time, as in step S503, the push communication control unit 410 of the server 102 stores the time and the transmission/reception state between the server 102 and the multifunction peripheral 101 in the communication status information storage unit 411 as a log.

In step S505, the push communication control unit 410 calculates the connection valid time upon success of push communication, based on the communication interval held in the communication status information storage unit 411. If the communication interval between steps S503 and S504 is, for example, 30 min, it is calculated as 30 min. In communication between ID "1" and ID "2" shown in FIG. 9, the communication interval is calculated as 30 min. Note that the connection valid time may be calculated for the interval between steps S502 and S503.

In step S506, the push communication control unit 410 records a maximum connection valid time for each connection from the connection valid time calculated in step S505, and the past longest connection valid time. The maximum connection valid time indicates a value at which the communication interval between one communication operation and another communication operation next to it is longest in information recorded as communication status information shown in FIG. 9. In an example shown in FIG. 9, the maximum connection valid time is 24 hrs.

The firewall 103 interrupts WebSocket connection upon timeout when, for example, a non-communication state between the multifunction peripheral 101 and the server 102 has continued for a long period of time (step S507). In this case, the value of a timer for determining timeout in the firewall 103 is defined in advance. Note that at the time of timeout, the multifunction peripheral 101 and the server 102 cannot recognize disconnection of connection because the firewall 103 does not notify the multifunction peripheral 101 and server 102 of disconnection of WebSocket connection.

In step S508, the server 102 transmits WebSocket data. Note that if the firewall 103 has interrupted WebSocket connection in step S507, the firewall 103 generates a notification error. Because the firewall 103 generates a notification error, in step S509 the server 102 receives the notification error, transmitted from the firewall 103, as the transmission result obtained in step S508.

In step S510, the push communication control unit 410 detects the notification error of the WebSocket data. As the communication error, TCP reset (RST), port unreachable, or timeout, for example, can be detected. At this time, the push communication control unit 410 of the server 102 stores the time and the transmission/reception state between the server 102 and the multifunction peripheral 101 in the communication status information storage unit 411 as a log. Note that in an example shown in FIG. 9, communication error information (that is, NG) is stored, as indicated by ID "5".

Although push communication can be performed from the server 102 to the multifunction peripheral 101 while WebSocket connection is established, it becomes impossible after the firewall 103 disconnects WebSocket connection. At this time, push communication from the server 102 to the multifunction peripheral 101 can be restarted as the multifunction peripheral 101 performs Keep-Alive transmission. Although the multifunction peripheral 101 re-executes Opening Handshake as Keep-Alive transmission in this embodiment, a Keep-Alive transmission method is not limited to this.

In general, when the Keep-Alive interval is set short, too much a load is imposed on a communication device and communication line. On the other hand, if the Keep-Alive interval is set long, connection is interrupted by the firewall 103, so the period in which the server 102 cannot transmit data to the multifunction peripheral 101 by push communication prolongs.

In step S511, the multifunction peripheral 101 performs Keep-Alive transmission to the server 102. The multifunction peripheral 101 performs transmission at the default Keep-Alive interval of the multifunction peripheral 101 because the server 102 has not notified the multifunction peripheral 101 of an appropriate Keep-Alive interval (a maximum connection valid time; to be described later). Note that the value of the default Keep-Alive interval is defined to gradually extend from the set default by, for example, the user in advance, and is held in the multifunction peripheral 101.

In step S512, the push communication control unit 410 of the server 102 uses the retransmission interval decision unit 412 to add a maximum connection valid time for each connection, which is held in the communication status information storage unit 411, to a reply packet in step S511, and sends it back to the multifunction peripheral. In an example shown in FIG. 9, "24 hrs" is transmitted as the value of the maximum connection valid time.

In step S513, the multifunction peripheral 101 uses the retransmission interval acquisition unit 405 to acquire a value to be set as the Keep-Alive interval from the value of the maximum connection valid time sent from the server 102 in step S512. Also, the connection management unit 404 sets the acquired value of the Keep-Alive interval.

In step S514, the connection management unit 404 of the multifunction peripheral 101 performs proxy user authentication for the firewall 103 at the Keep-Alive interval set in step S513. In step S515, the firewall 103 resets the timer for timeout of connection between the multifunction peripheral 101 and the server 102.

In step S516, the connection management unit 404 of the multifunction peripheral 101 performs proxy user re-authentication at the set Keep-Alive interval before the firewall 103 disconnects connection upon timeout. With this operation, communication between the multifunction peripheral 101 and the server 102 is permitted again, and the timer for timeout in the firewall 103 is reset. Note that the Keep-Alive interval in user re-authentication may start at the time of the previous user authentication operation, or the last time the server 102 performed push communication.

User re-authentication in step S516 is performed at the Keep-Alive interval set in step S513, so connection between the multifunction peripheral 101 and the server 102 is maintained. In step S517, the server 102 can perform push communication with the multifunction peripheral 101. This is done to avoid a communication error due to connection disconnection by resetting the timer for timeout in step S516.

Note that in this embodiment, proxy user authentication is performed as Keep-Alive transmission in steps S514 and S516. However, the present invention is not limited to this, and is also applicable to the case wherein a communication device in a communication path is prevented from being interrupted in other protocols.

[Processing Sequence in Push Communication Control Unit]

Figure 6:
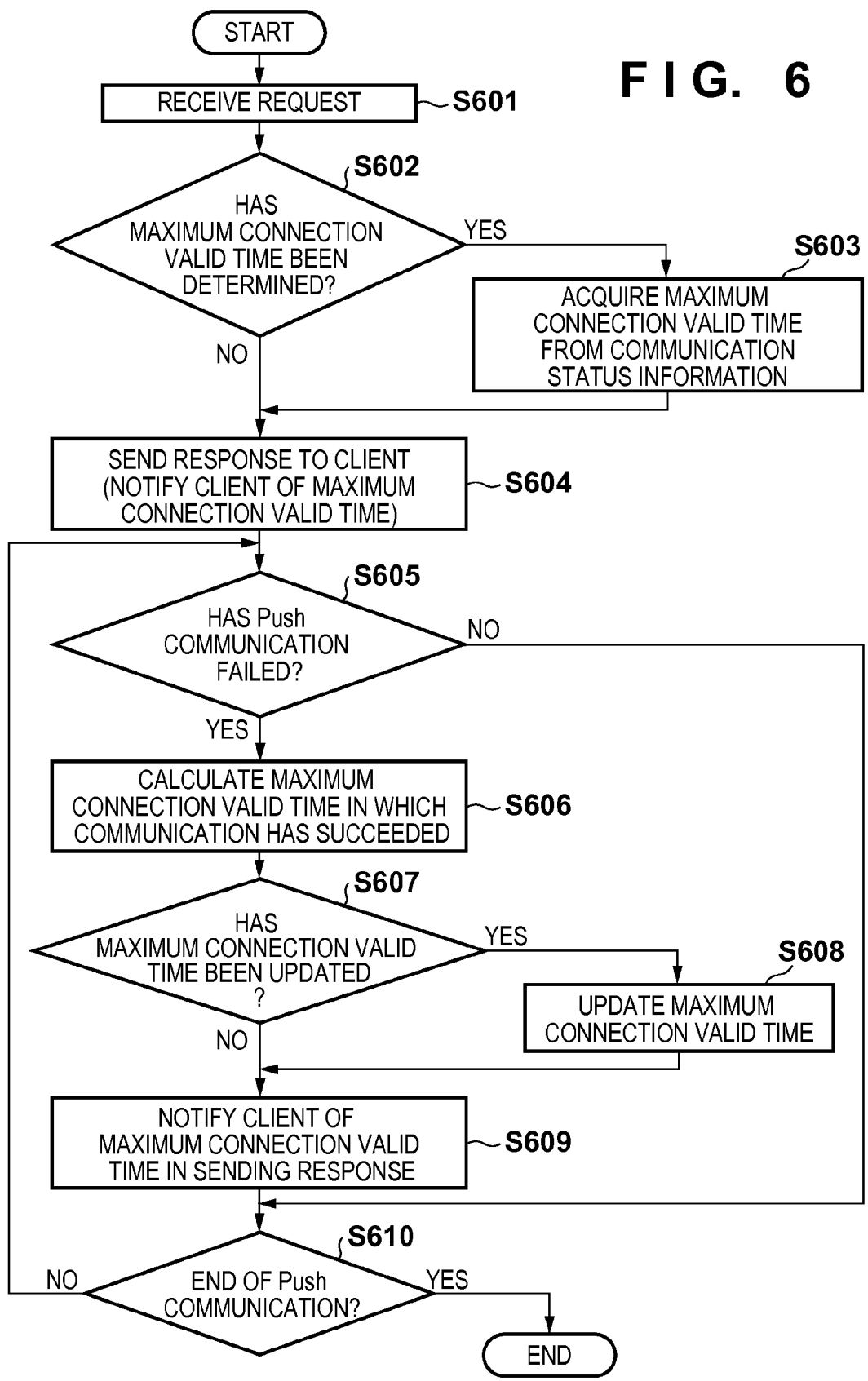
FIG. 6 is a flowchart illustrating an example of the sequence of processing by a push communication control unit.

FIG. 6 shows the processing sequence of the push communication control unit 410 of the server 102. More specifically, FIG. 6 shows processing performed by the server 102 in the sequence shown in FIG. 5. This processing sequence is implemented by, for example, making the CPU 1 of the server 102 read out a program stored in, for example, the ROM 3 serving as a storage unit to the RAM 2, and execute it.

In step S601, the push communication control unit 410 receives a push communication request from the multifunction peripheral 101. This operation corresponds to step S502 in FIG. 5.

In step S602, the push communication control unit 410 acquires the communication status information of the multifunction peripheral 101 from the communication status information storage unit 411 to determine whether the maximum connection valid time is determined, based on the acquired past communication status. Note that in step S602, this determination operation is done based on the past communication status information including not only the communication status information of the multifunction peripheral 101, but also that of the multifunction peripheral 105 belonging to an identical domain.

If no maximum connection valid time is determined (NO in step S602), the determination operation cannot be done based on the past communication status information, so in step S604 the server 102 designates the default maximum connection valid time, and sends a reply to the client (multifunction peripheral) (step S502 in FIG. 5). In this case, the client (multifunction peripheral) sets the default Keep-Alive interval. Note that if NO is determined in step S602, the server 102 may send a reply to the client without designating the maximum connection valid time, but the multifunction peripheral sets the default Keep-Alive interval in either case.

If the maximum connection valid time is determined (YES in step S602), in step S603 the push communication control unit 410 acquires the maximum connection valid time of push communication with the multifunction peripheral 101 based on the communication status information stored in the communication status information storage unit 411.

In step S604, the push communication control unit 410 sends the maximum connection valid time acquired in step S603 back to the client (multifunction peripheral 101) as a reply to the request received in step S601. In this case, the client (multifunction peripheral) sets the Keep-Alive interval based on the received maximum connection valid time.

While connection is maintained, push communication can be performed from the server to the multifunction peripheral (steps S503 & S504 in FIG. 5).

If communication is interrupted by the firewall 103, the push communication control unit 410 is notified of an error for push communication from the server 102 (step S509 in FIG. 5), so the push communication control unit 410 detects a failure of push communication in step S605 (step S510 in FIG. 5).

If a failure of push communication is detected (YES in step S605), in step S606 the push communication control unit 410 acquires the communication status information of the multifunction peripheral 101 from the communication status information storage unit 411, and calculates the maximum connection valid time from the past communication status (step S505 in FIG. 5). At this time, it is desired to look up a log within a predetermined period (or logs corresponding to a predetermined count), instead of looking up all the communication statuses remaining in the log. A longest non-communication time in the last week remaining in the log, for example, can be determined as a maximum connection valid time. With this operation, by looking up the recent log, and not looking up the old log, an optimum maximum connection valid time can be calculated based on the recent communication status even if the timeout setting of the firewall 103 is changed.

In step S607, the push communication control unit 410 determines whether the maximum connection valid time (or the default maximum connection valid time) sent to the client (multifunction peripheral 101) in step S604 is different from that calculated in step S606. If these two maximum connection valid times are different (YES in step S607), the push communication control unit 410 stores the maximum connection valid time calculated in step S606 in the communication status information storage unit 411 in step S608.

Note that the push communication control unit 410 may update the valid time as needed at times other than upon the occurrence of a push communication error. The valid time can be updated as needed when, for example, the maximum connection valid time calculated from the past communication operation in step S506 at the time of communication success is stored in the communication status information storage unit 411 the moment the calculated maximum connection valid time exceeds the previous maximum connection valid time.

In step S609, the push communication control unit 410 uses the retransmission interval decision unit 412 to add the maximum connection valid time, which is held in the communication status information storage unit 411, to a packet as a reply to a request from the multifunction peripheral 101, and sends it back (step S512 in FIG. 5).

In step S610, the push communication control unit 410 determines a push communication end request from the multifunction peripheral 101, or that of the server 102. If the end of push communication is determined (YES in step S610), the processing sequence ends.

[Processing Sequence in Connection Management Unit]

Figure 7:
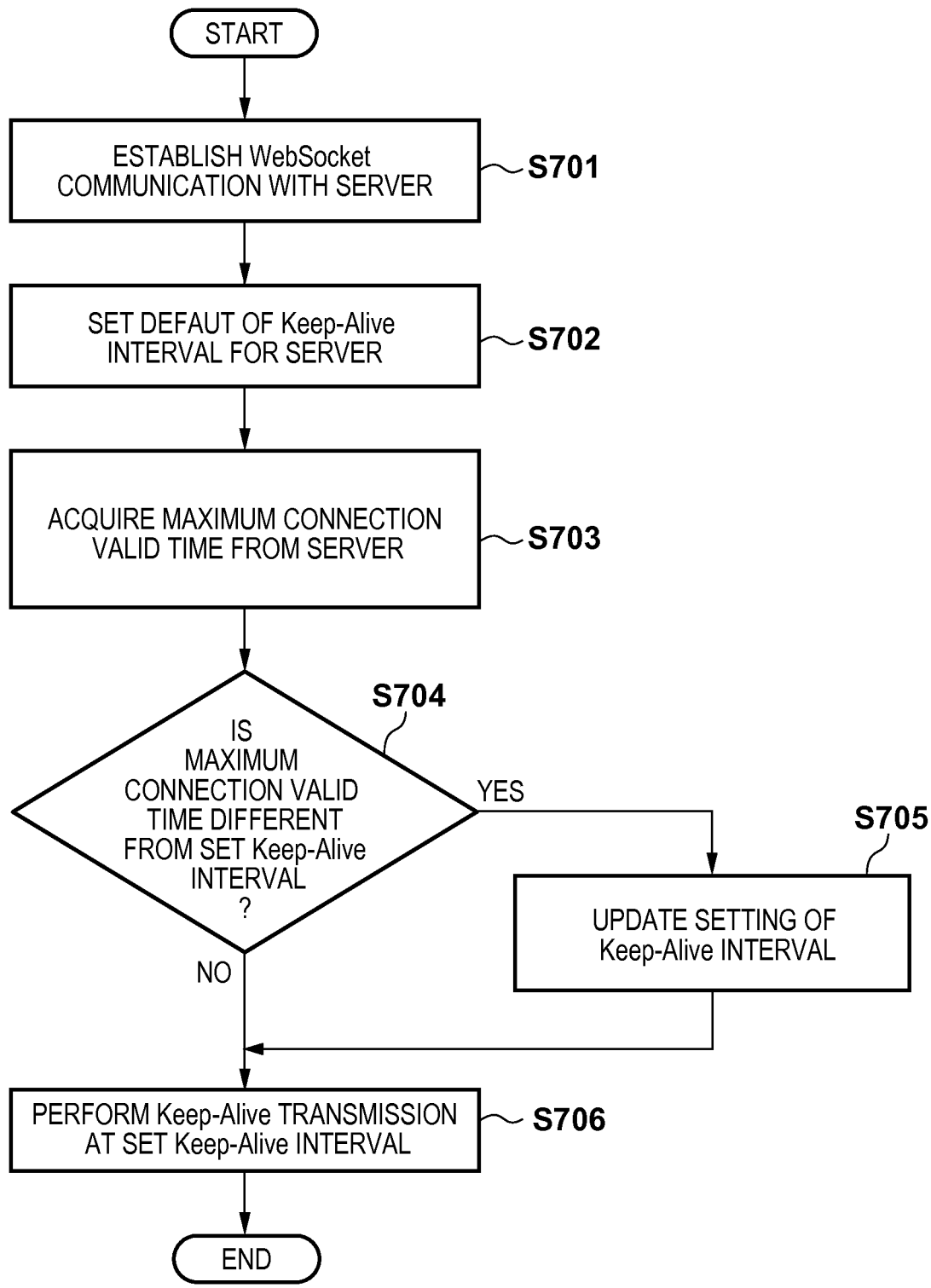
FIG. 7 is a flowchart illustrating an example of the sequence of processing by a connection management unit.

FIG. 7 shows the processing sequence of the connection management unit 404 of the multifunction peripheral 101. This processing sequence shows processing performed by the multifunction peripheral 101 in the sequence shown in FIG. 5. This processing sequence is implemented by, for example, making a CPU (not shown) of the multifunction peripheral 101 read out a program stored in a storage unit to a RAM (not shown), and execute it. Note that the same processing is performed when the multifunction peripheral 105 communicates with the server 102, in place of the multifunction peripheral 101.

In step S701, the connection management unit 404 uses the connection generation unit 406 to establish WebSocket connection to the server 102. If the default maximum connection valid time is transmitted from the server 102 (or if no maximum connection valid time is transmitted), the connection management unit 404 sets a default for the Keep-Alive interval in step S702. On the other hand, if the maximum connection valid time is transmitted from the server 102 (step S512 in FIG. 5), in step S703 the connection management unit 404 uses the retransmission interval acquisition unit 405 to acquire the maximum connection valid time for each connection from the server 102.

In step S704, the connection management unit 404 determines whether the acquired maximum connection valid time is different from the Keep-Alive interval. If the maximum connection valid time is different (YES in step S704), the process advances to step S705. If the maximum connection valid time is equal to the Keep-Alive interval (NO in step S704), the process advances to step S706.

In step S705, the connection management unit 404 updates the setting of an appropriate Keep-Alive interval to maintain connection in push communication, using the value of the acquired maximum connection valid time. This operation corresponds to step S513 in FIG. 5. In step S706, the connection management unit 404 performs proxy user authentication at the Keep-Alive interval set in step S705. This operation corresponds to step S516 in FIG. 5. The processing sequence ends.

With this operation, the server 102 can perform push communication while avoiding a communication error due to connection disconnection even if a non-communication state continues past the timeout time of the firewall 103.

According to the above-mentioned first embodiment, when the firewall 103 disconnects connection in push communication, the server 102 detects connection disconnection (step S510). The server 102 notifies the multifunction peripheral 101 of the maximum connection valid time based on the recent communication status (step S512). Further, the client (multifunction peripheral 101) can maintain connection because it performs proxy user re-authentication at an appropriate time interval by setting an appropriate Keep-Alive interval again using the received maximum connection valid time.

It is therefore possible to provide an efficient communication system which is less likely to generate communication errors. More particularly, it is possible to provide a communication system capable of reducing communication errors even in a communication environment in which the client cannot autonomously decide the Keep-Alive interval, and no communication error can be immediately transmitted to the client even if a server communication error is detected.

Second Embodiment

The first embodiment shows an example of one push communication connection between the multifunction peripheral 101 and the server 102. This embodiment shows an example in which a plurality of push communication connections are generated between a multifunction peripheral 101 and a server 102.

When a plurality of connections are generated between the same server and client, if non-disconnected connection is present, the number of Keep-Alive transmission operations from the multifunction peripheral can be reduced by preferentially using a non-disconnected line. This indicates that a trial to restore disconnected connection is made using non-connected connection. If restoration of connection succeeds, the number of Keep-Alive transmission operations can be reduced.

For this reason, a push communication control unit 410 of the server 102 must determine a connection management unit 404 of the same multifunction peripheral from a plurality of connections to be managed. Hence, the connection management unit 404 of the multifunction peripheral notifies the server 102 of an identifier unique to the connection management unit 404 of the multifunction peripheral in generating connection to the server 102.

The push communication control unit 410 of the server 102 uses a plural connection management unit 414 to manage the identifier of the connection management unit 404 of the multifunction peripheral. A unique identifier such as a UUID (Universally Unique Identifier) is managed. At this time, one connection management unit 404 is provided to each multifunction peripheral. Note that identifiers may be assigned by an arbitrary method as long as a plurality of connections having the same connection destination can be specified.

The plural connection management unit 414 registers an identifier serving as a connection destination in a connection destination identifier management unit 415 which manages the connection destination for each connection. The plural connection management unit 414 uses a connection destination determination unit 416 to determine identical multifunction peripherals based on the data of the connection destination identifier management unit 415.

The push communication control unit 410 of the server 102 determines connection to the same connection destination based on the connection destination information managed by the plural connection management unit 414. When connection to the same connection destination is present, if a communication error for a push communication line occurs due to connection disconnection, the push communication control unit 410 restores the disconnected connection using another connection to the same connection destination, and performs data transfer. Note that as a restoration method, the multifunction peripheral 101 may perform WebSocket Opening Handshake again via non-disconnected connection. However, another method may be used.

A redundant push communication line need not use the same protocol. Other protocols can also be used by setting, in advance, a line which allows communication in the connection management unit 404 of the multifunction peripheral from the push communication control unit 410 of the server 102.

A plurality of connections can be provided using protocols including email, XMPP (Extensible Messaging and Presence Protocol: RFC6121), and SIP (Session Initiation Protocol: RFC3261).

As described above, if non-disconnected connections are present even when connection is disconnected, the disconnected connection is restored using these non-disconnected connections. This makes it possible to build an efficient push communication system which continuously maintains push communication connection, and is less likely to generate communication errors.

Third Embodiment

The third embodiment shows an example in which a plurality of push communication connections are generated on identical domains. An example in which a plurality of multifunction peripherals (multifunction peripherals 101 and 105) are connected to identical domains will be given. This embodiment shows an example in which a system which performs efficient push communication when the same firewall 103 is connected between the multifunction peripherals 101 and 105 and a server 102, and serves as a network device which disconnects connection under the same conditions is built.

The maximum connection valid time is considered to be the same value for the plurality of multifunction peripherals 101 and 105 connected to the server 102 via the same firewall 103. This makes it possible to decide appropriate Keep-Alive intervals for the multifunction peripherals 101 and 105 before an error occurs in connection of push communication.

If the plurality of multifunction peripherals 101 and 105 have identical domains, it is highly probable that the same firewall 103 is present in the communication path with the server 102. Hence, when the same firewall 103 serving as a network device which disconnects connection is present, it is highly probable that disconnection occurs under the same conditions (for example, the timeout time).

An identical domain determination unit 413 of the server 102 determines whether a plurality of multifunction peripherals belong to identical domains. If the domains of the multifunction peripherals are identical, the identical domain determination unit 413 determines that the firewall 103 is the same, and notifies a retransmission interval decision unit 412 of the maximum connection valid time for the identical domains.

Assume that multifunction peripheral A at xxx001.yyy.co.jp, and multifunction peripheral B at xxx002.yyy.co.jp, for example, are present. At this time, when multifunction peripheral A performs Opening Handshake of WebSocket for the server 102, the identical domain determination unit 413 determines that multifunction peripheral B belongs to an identical domain "yyy.co.jp." Further, if the maximum connection valid time at xxx002.yyy.co.jp is 60 min, the identical domain determination unit 413 notifies the retransmission interval decision unit 412 of this value. Hence, a push communication control unit 410 notifies the multifunction peripheral 101 of a Keep-Alive interval of 60 min. A retransmission interval acquisition unit 405 performs Keep-Alive transmission within 60 min.

[Processing Sequence in Push Communication Control Unit]

Figure 8:
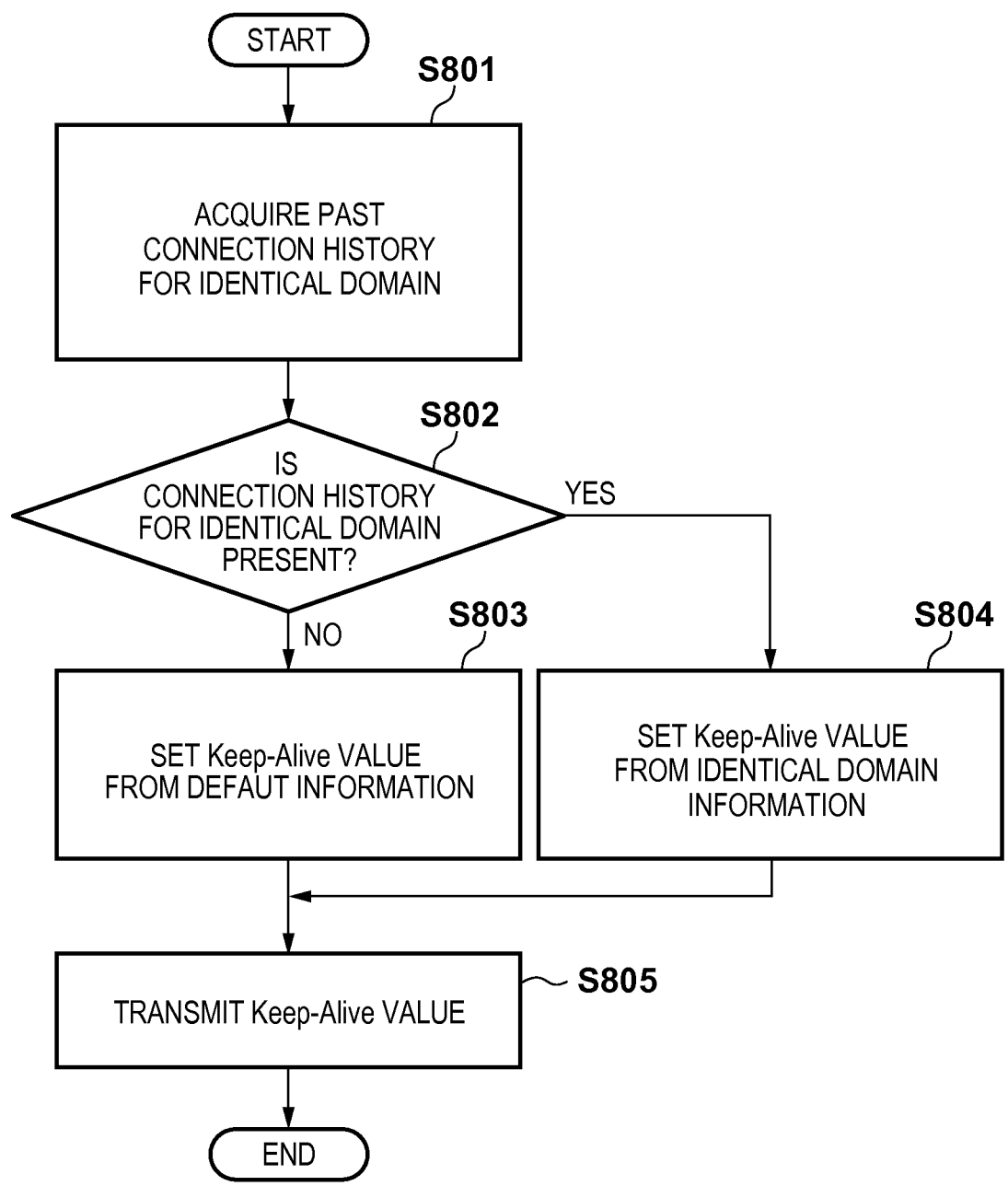
FIG. 8 is a flowchart illustrating an example of the sequence of processing by a push communication control unit.

FIG. 8 shows an identical domain control sequence in the push communication control unit 410 of the server 102. This processing sequence is implemented by, for example, making a CPU 1 of the server 102 read out a program stored in, for example, a ROM 3 serving as a storage unit to a RAM 2, and execute it.

This processing sequence can also be performed in processing of determining whether the maximum connection valid time in step S602 according to the first embodiment is determined.

In step S801, the push communication control unit 410 uses the identical domain determination unit 413 to acquire the past connection history for an identical domain. In step S802, the push communication control unit 410 uses the identical domain determination unit 413 to search for the connection histories of other multifunction peripherals belonging to identical domains. If the connection histories of other multifunction peripherals belonging to identical domains are present (YES in step S802), the process advances to step S803. On the other hand, if no connection history is present (NO in step S802), the process advances to step S804.

In step S803, the push communication control unit 410 uses the retransmission interval decision unit 412 to set the value of the Keep-Alive interval based on device default information. The process advances to step S805.

In step S804, the push communication control unit 410 uses the identical domain determination unit 413 to set the value of the Keep-Alive interval using the value of the maximum connection valid time acquired from the history information of identical domains. The process advances to step S805.

In step S805, the push communication control unit 410 transmits the maximum connection valid time to the multifunction peripheral 101. The processing sequence ends.

Note that this processing sequence may be executed when, for example, the maximum connection valid time in connection to an identical multifunction peripheral is updated.

As described above, according to this embodiment, when the firewall 103 disconnects connection in push communication, the server 102 detects the maximum connection valid time from the information of other multifunction peripherals belonging to identical domains. Proxy user re-authentication can be performed at an appropriate Keep-Alive interval using this value. It is therefore possible to provide an efficient communication system.

Fourth Embodiment

A configuration which decides the Keep-Alive retransmission interval in accordance with the operation conditions of a multifunction peripheral 101 serving as a client apparatus will be described in this embodiment. A retransmission interval determination unit 407 of the multifunction peripheral 101 determines a Keep-Alive transmission interval acquired from a server 102 to decide a transmission interval that can be set in the multifunction peripheral 101. The retransmission interval determination unit 407 changes the Keep-Alive transmission interval in accordance with the operation conditions of the multifunction peripheral 101 if the Keep-Alive transmission interval acquired from the server 102 does not satisfy the operation conditions of the multifunction peripheral 101.

The operation conditions of the multifunction peripheral 101 are decided in accordance with, for example, power consumption setting policy or communication setting policy. Also, a UI unit 302 or management software (not shown) of the multifunction peripheral 101, for example, is used to set an operation condition for determining whether to prioritize the operation conditions of the multifunction peripheral 101 or the maximum connection valid time of the server 102.

Assume that the Keep-Alive transmission interval is set longer than, for example, 1 hr while the multifunction peripheral 101 is in a power consumption operation. In this case, if the maximum connection valid time acquired from the server 102 is 15 min, the multifunction peripheral 101 prioritizes the transmission interval as the operation condition to set it longer than 1 hr. With this operation, the multifunction peripheral 101 sets the Keep-Alive transmission interval to 1 hr when the maximum connection valid time of the server 102 is 15 min.

Also, the UI unit 302 or the management software of the multifunction peripheral 101, for example, performs determination as to whether the Keep-Alive transmission interval is to be changed in relation to the maximum connection valid time. If, for example, the difference between the maximum connection valid time and the Keep-Alive transmission interval is smaller than a predetermined threshold, it may be possible to perform setting for, for example, not changing the Keep-Alive transmission interval of the multifunction peripheral 101. A change in transmission interval can be determined by setting the predetermined threshold to, for example, 30 min.

As described above, according to this embodiment, in addition to the effect of the first embodiment, the Keep-Alive interval can be set in accordance with the operation conditions of the multifunction peripheral. It is therefore possible to provide an efficient communication system corresponding to the operation settings of the client.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-047303 filed Mar. 2, 2012 and 2013-033871 filed Feb. 22, 2013, which are hereby incorporated by reference herein in their entirety.

The invention claimed is:

1. A communication system in which a server apparatus on the Internet is connected to at least one client apparatus on an intranet via a firewall, wherein
the client apparatus comprises a processor for executing a client program, wherein the processor of the client apparatus functions as:
a generation unit configured to generate connection to allow push communication for the server apparatus, wherein the server apparatus executes push communication with the client apparatus by using the generated connection;
an acquisition unit configured to acquire, from the server apparatus, information associated with a transmission interval at which notifications are periodically transmitted to maintain the connection; and
a management unit configured to maintain the connection, generated by the generation unit, by periodically transmitting the notifications based on the information associated with the transmission interval acquired by the acquisition unit, and
wherein the server apparatus comprises a processor for executing a server program, wherein the processor of the server apparatus functions as:
a storage unit configured to store, as communication status information, the connection generated by the generation unit;
a communication control unit configured to transmit data of push communication to the client apparatus using the connection, wherein the data of push communication is transmitted without receiving an instruction from other apparatus;
a detection unit configured to detect whether the transmitted data of push communication is interrupted by the firewall, wherein the storage unit stores access information of the push communication as the communication status information if the detection unit detects that the transmitted data of push communication is not interrupted by the firewall, and wherein the storage unit stores information of an interruption as the communication status information if the detection unit detects that the transmitted data of push communication is interrupted by the firewall;
a decision unit configured to decide an interval, in which the connection for the push communication can be maintained in non-communication, based on the communication status information stored in the storage unit; and
a notification unit configured to notify the client apparatus of the interval decided by the decision unit as information associated with the transmission interval used to maintain the connection for the push communication.

2. The system according to claim 1, wherein the decision unit calculates at least one period, for which non-communication has continued, between a communication operation in which communication with the client apparatus has succeeded using the connection, and a previous communication operation in which communication with the client apparatus has succeeded, and decides, as the interval, a value of a longest period of the calculated periods.

3. The system according to claim 1, wherein the notifications are periodically transmitted by Keep-Alive transmission for the firewall.

4. The system according to claim 1, wherein the server apparatus further comprises a plural connection management unit configured to manage a plurality of different connections for push communication between the server apparatus and an identical client apparatus.

5. The system according to claim 4, wherein when the connection for the push communication is disconnected, the communication control unit restores the disconnected connection using another connection, connected to a connection destination identical to a connection destination connected to the disconnected connection, of connections managed by the plural connection management unit.

6. The system according to claim 1, wherein
the server apparatus further comprises an identical domain determination unit configured to specify a plurality of client apparatuses belonging to identical domains, and
the decision unit decides, as the interval, an identical value for the plurality of client apparatuses belonging to the identical domains, which are specified by the identical domain determination unit.

7. The system according to claim 1, wherein
the client apparatus further comprises a determination unit configured to determine whether the information associated with the transmission interval acquired from the server apparatus satisfies an operation condition set in the client apparatus, and
if the determination unit determines that the operation condition is satisfied, the management unit transmits the notifications in accordance with the transmission interval acquired from the server apparatus.

8. The system according to claim 1, wherein the management unit uses the information associated with the transmission interval acquired from the server apparatus if a difference between a value of the transmission interval set in the client apparatus, and the information associated with the transmission interval acquired from the server apparatus is larger than a predetermined threshold.

9. A client apparatus on an intranet connected to a server apparatus on the Internet via a firewall, comprising a processor for executing a client program, wherein the processor of the client apparatus functions as:
a generation unit configured to generate connection to allow push communication for the server apparatus, wherein the server apparatus executes push communication with the client apparatus by using the generated communication;
an acquisition unit configured to acquire, from the server apparatus, information associated with a transmission interval at which notifications are periodically transmitted to maintain the connection; and a management unit configured to maintain the connection to the server apparatus, generated by the generation unit, by periodically transmitting the notifications based on the information associated with the transmission interval acquired by the acquisition unit, and wherein the server apparatus comprises a processor for executing a server program wherein the processor of the server apparatus functions as:

a storage unit configured to store, as communication status information, the connection generated by the generation unit;

a communication control unit configured to transmit data of push communication to the client apparatus using the connection, wherein the data of push communication is transmitted without receiving an instruction from other apparatus;

a detection unit configured to detect whether the transmitted data of push communication is interrupted by the firewall, wherein the storage unit stores access information of the push communication as the communication status information if the detection unit detects that the transmitted data of push communication is not interrupted by the firewall, and wherein the storage unit stores information of an interruption as the communication status information if the detection unit detects that the transmitted data of push communication is interrupted by the firewall;

a decision unit configured to decide an interval, in which the connection for the push communication can be maintained in non-communication, based on the communication status information stored in the storage unit; and a notification unit configured to notify the client apparatus of the interval decided by the decision unit as information associated with the transmission interval used to maintain the connection for the push communication.

10. A server apparatus connected to at least one client apparatus on an intranet via a firewall, comprising a processor for executing a server program, wherein the processor of the server apparatus functions as:

a storage unit configured to store, as communication status information, the connection generated by a client apparatus;

a communication control unit configured to transmit data of push communication to the client apparatus using the connection, wherein the data of push communication is transmitted without receiving an instruction from other apparatus;

a detection unit configured to detect whether the transmitted data of push communication is interrupted by the firewall, wherein the storage unit stores access information of the push communication as the communication status information if the detection unit detects that the transmitted data of push communication is not interrupted by the firewall, and wherein the storage unit stores information of an interruption as the communication status information if the detection unit detects that the transmitted data of push communication is interrupted by the firewall;

a decision unit configured to decide an interval, in which the connection for the push communication can be maintained in non-communication, based on the communication status information stored in the storage unit; and a notification unit configured to notify the client apparatus of the interval decided by the decision unit as information associated with a transmission interval for communication to maintain the connection in the push communication.

11. A communication method for a client apparatus on an intranet connected to a server apparatus on the Internet via a firewall, comprising steps of:

generating connection to allow push communication for the server apparatus, wherein the server apparatus executes push communication with the client apparatus by using the generated communication;

acquiring, from the server apparatus, information associated with a transmission interval at which notifications are periodically transmitted to maintain the connection; and maintaining the connection to the server apparatus, generated in the generating step, by periodically transmitting the notifications based on the information associated with the transmission interval acquired in the acquiring step, wherein the server apparatus executes steps of:

storing, as communication status information, the connection generated in the generating step;

transmitting data of push communication to the client apparatus using the connection, wherein the data of push communication is transmitted without receiving an instruction from other apparatus;

detecting whether the transmitted data of push communication is interrupted by the firewall, wherein access information of the push communication is stored as the communication status information if it is detected in the detecting step that the transmitted data of push communication is not interrupted by the firewall, and wherein information of an interruption is stored as the communication status information if it is detected in the detecting step that the transmitted data of push communication is interrupted by the firewall;

deciding an interval, in which the connection for the push communication can be maintained in non-communication, based on the stored communication status information; and notifying the client apparatus of the interval decided in the deciding step as information associated with the transmission interval used to maintain the connection for the push communication.

12. A communication method for a server apparatus connected to at least one client apparatus on an intranet via a firewall, comprising:

storing, as communication status information, the connection generated by a client apparatus;

transmitting data of push communication to the client apparatus using the connection, wherein the data of push communication is transmitted without receiving an instruction from other apparatus;

detecting whether the transmitted data of push communication is interrupted by the firewall, wherein access information of the push communication is stored in the storing step as the communication status information if in the detecting step, it is detected that the transmitted data of push communication is not interrupted by the firewall, and wherein information of an interruption is stored in the storing step as the communication status information if in the detecting step, it is detected that the transmitted data of push communication is interrupted by the firewall;

deciding an interval, in which the connection for the push communication can be maintained in non-communication, based on the stored communication status information; and notifying the client apparatus of the interval decided in the deciding step as information associated with a transmission interval in communication performed to maintain the connection for the push communication.

13. A non-transitory computer-readable storage medium storing a program for causing a computer to function as:
- a generation unit configured to generate connection to allow push communication for the server apparatus, wherein to a server apparatus executes push communication with the computer by using the generated communication on the Internet connected via a firewall;
- an acquisition unit configured to acquire, from the server apparatus, information associated with a transmission interval at which notifications are periodically transmitted to maintain the connection; and
- a management unit configured to maintain the connection to the server apparatus, generated by the generation unit, by periodically transmitting the notifications based on the information associated with the transmission interval acquired by the acquisition unit, and
- wherein the server apparatus comprises a processor for executing a server program, wherein the processor of the server apparatus functions as:
- a storage unit configured to store, as communication status information, the connection generated by the generation unit;
- a communication control unit configured to transmit data of push communication to the computer using the connection, wherein the data of push communication is transmitted without receiving an instruction from other apparatus;
- a detection unit configured to detect whether the transmitted data of push communication is interrupted by the firewall, wherein the storage unit stores access information of the push communication as the communication status information if the detection unit detects that the transmitted data of push communication is not interrupted by the firewall, and wherein the storage unit stores information of an interruption as the communication status information if the detection unit detects that the transmitted data of push communication is interrupted by the firewall;
- a decision unit configured to decide an interval, in which the connection for the push communication can be maintained in non-communication, based on the communication status information stored in the storage unit; and
- a notification unit configured to notify the computer of the interval decided by the decision unit as information associated with the transmission interval used to maintain the connection for the push communication.

14. A non-transitory computer-readable storage medium storing a program for causing a computer to function as:
- a storage unit configured to store, as communication status information, the connection generated by a client apparatus;
- a communication control unit configured to transmit data of push communication to a client apparatus using the connection, wherein the data of push communication is transmitted without receiving an instruction from other apparatus on an intranet connected via a firewall;
- a detection unit configured to detect whether the transmitted data of push communication is interrupted by the firewall, wherein the storage unit stores access information of the push communication as the communication status information if the detection unit detects that the transmitted data of push communication is not interrupted by the firewall, and wherein the storage unit stores information of an interruption as the communication status information if the detection unit detects that the transmitted data of push communication is interrupted by the firewall;
- a decision unit configured to decide an interval, in which the connection for the push communication can be maintained in non-communication, based on the stored communication status information; and
- a notification unit configured to notify the client apparatus of the interval decided by the decision unit as information associated with a transmission interval in communication to maintain the connection for the push communication.

* * * * *